United States Patent
Khan-Afshar Mohammadi et al.

(10) Patent No.: US 10,216,613 B2
(45) Date of Patent: Feb. 26, 2019

(54) RESERVED PROCESS AND THREAD IDENTIFIERS FOR TRACING

(71) Applicant: International Business Machines Corporation, Armonk, NY (US)

(72) Inventors: Kurosh Khan-Afshar Mohammadi, Madrid (ES); Daniel A. Koo Mo Shan, London Borough of Sutton (GB); Geert Oost, Urk (NL); Robert W. Thompson, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 108 days.

(21) Appl. No.: 15/347,200

(22) Filed: Nov. 9, 2016

(65) Prior Publication Data

US 2018/0052760 A1    Feb. 22, 2018

(30) Foreign Application Priority Data

Aug. 17, 2016 (EP) ..................................... 16382397

(51) Int. Cl.
    *G06F 11/36*    (2006.01)
(52) U.S. Cl.
    CPC .......... *G06F 11/3636* (2013.01); *G06F 11/36* (2013.01); *G06F 11/362* (2013.01); *G06F 11/364* (2013.01); *G06F 11/3612* (2013.01); *G06F 2201/865* (2013.01); *G06F 2201/87* (2013.01)

(58) Field of Classification Search
    None
    See application file for complete search history.

(56) References Cited

U.S. PATENT DOCUMENTS

| | | | |
|---|---|---|---|
| 5,522,077 A * | 5/1996 | Cuthbert | ................. G06F 9/465 |
| 6,553,564 B1 | 4/2003 | Alexander, III et al. | |
| 6,754,890 B1 | 6/2004 | Berry et al. | |
| 7,089,561 B2 * | 8/2006 | Morrison | ................. G06F 9/54 |
| | | | 719/312 |
| 7,369,954 B2 * | 5/2008 | Levine | ................. G06F 11/3466 |
| | | | 702/187 |

(Continued)

OTHER PUBLICATIONS

Applegate et al., "Without a Trace: A Description of Augmentations Implemented in EZIPC to Allow Message Queues and Semaphore Tracking", Computer Science Department Wake Forest University, Apr. 21, 2009, pp. 1-19.

(Continued)

*Primary Examiner* — Lewis A Bullock, Jr.
*Assistant Examiner* — Mark A Gooray
(74) *Attorney, Agent, or Firm* — Cantor Colburn LLP

(57) ABSTRACT

A system debugs software code and performs a method of debugging software code. The method includes starting execution of an instantiation of a process within the software code and determining whether the instantiation of the process corresponds with any entry in a database of reserved process identifiers (PIDs) and thread identifiers (TIDs). The system also includes assigning the PID and the TID from among the reserved PIDs and the TIDs in the database to the instantiation of the process based on the instantiation of the process corresponding with any entry in the database.

20 Claims, 6 Drawing Sheets

(56) References Cited

U.S. PATENT DOCUMENTS

| | | | | |
|---|---|---|---|---|
| 8,131,932 B2* | 3/2012 | Parthasarathy | ..... | G06F 12/0875 |
| | | | | 711/118 |
| 9,135,127 B1* | 9/2015 | Havemose | ....... | G06F 11/1451 |
| 2013/0145350 A1* | 6/2013 | Marinescu | ....... | G06F 11/3636 |
| | | | | 717/128 |

OTHER PUBLICATIONS

Haffner et al., "ACAS: Automated Construction of Application Signatures", Proceedings of the 2005 ACM SIGCOMM workshop on Mining network data. ACM, 2005, pp. 197-202.

Punti et al., "gtrace: function call and memory access traces of dynamically linked programs in IA-32 and IA-64 Linux", Technical report, UPC-DAC-2002-51, 2002, pp. 1-90.

Zhao et al., "Visualizing the execution of threads-based parallel programs", Technical Report GIT-GVU-95-01, Georgia Institute of Technology, 1995, pp. 1-17.

* cited by examiner

| Event Handler 201 | Executable Name 202 | Process ID (PID) 203 | Trace ID (TID) 204 | Use Indicator 206 |
|---|---|---|---|---|
| 1001 | syncd | 0x017060 | 0x0220A3 | 1 |
| 1002 | nfsd | 0x03D07A | 0x025089 | 1 |
|  |  |  | 0x0260c1 | 0 |
| 1003 | nfsd | 0x03E07C | 0x0790F3 | 1 |
|  |  |  | 0x07A0F5 | 1 |
|  |  |  | 0x08C019 | 0 |

200 ⟵ (table)
205a, 205b, 205c ⟵ rows

FIG. 2

RESERVED PROCESS AND THREAD IDENTIFIERS FOR TRACING

FOREIGN PRIORITY

This application claims the benefit of priority to European Application No. 16382397.4 filed Aug. 17, 2016, the disclosure of which is incorporated herein by reference in its entirety.

BACKGROUND

The present invention relates to software debugging, and more specifically, to reserved process and thread identifiers (IDs) for tracing.

In software engineering, tracing involves designating trace hooks in the code path and recording information relating to the hooks during execution of the code. Trace hooks are designated prior to code execution and can be changed (e.g., prior trace hooks can be un-designated and new trace hooks can be designated) prior to a subsequent execution. A trace hook is associated with an operation. As such, an executable (i.e., process) that includes a number of operations can have zero, one, or more than one trace hook associated with it. Tracing has similarities to but is distinct from event logging, which is related to diagnosing the performance of software. Once the code with trace hooks has been executed, analyzing the resulting trace log file facilitates debugging of the code. The trace hooks can be designated by the operating system or, more commonly, a programmer who designates the specific operations in the code that are of interest. The trace log identifies the trace hooks that were encountered during execution of the code and includes the process identifier (PID) and thread identifier (TID) associated with the executable of each trace hook. The TID and PID are currently randomly assigned. Thus, when the tracing is executed on two different machines, for example, different thread and process IDs can (likely, will) be assigned to the same executable.

SUMMARY

According to an embodiment of the present invention, a computer-implemented method of debugging software code includes starting execution, using a processor, of an instantiation of a process within the software code; determining whether the instantiation of the process corresponds with any entry in a database of reserved process identifiers (PIDs) and thread identifiers (TIDs); and assigning the PID and the TID from among the reserved PIDs and the TIDs in the database to the instantiation of the process based on the instantiation of the process corresponding with any entry in the database.

According to another embodiment, a system to debug software code includes a memory device configured to store a database of reserved process identifiers (PIDs) and trace identifiers (TIDs); and a processor configured to start execution of an instantiation of a process within the software code, determine whether the instantiation of the process corresponds with an entry in the database, and assign the PID and the TID from among the reserved PIDs and the TIDs in the database to the instantiation of the process based on the instantiation of the process corresponding with any entry in the database.

According to yet another embodiment, a computer program product for debugging software code includes a computer readable storage medium having program instructions embodied therewith, the program instructions executable by a processor to perform a method. The method includes starting execution of an instantiation of a process within the software code; determining whether the instantiation of the process corresponds with any entry in a database of reserved process identifiers (PIDs) and thread identifiers (TIDs); and assigning the PID and the TID from among the reserved PIDs and the TIDs in the database to the instantiation of the process based on the instantiation of the process corresponding with any entry in the database.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 2 shows an exemplary database of reserved process identifiers and thread identifiers according to one or more embodiments;

DETAILED DESCRIPTION

As previously noted, a trace log is created based on designated trace hooks (associated with executables of interest) in software code. The trace log stores information associated with the trace hooks in correspondence with the PID and TID of their associated executables. The trace log facilitates debugging of the software code. However, correctly associating the PIDs and TIDs that index the information in the trace log with the correct executable (and associated trace hook) becomes more challenging when the code is executed on different machines. Different machines may be involved in the execution at different times or multiple processors on multiple machines may execute the code simultaneously (e.g., in a cloud computing environment). The challenge stems from the fact that PIDs and TIDs are currently randomly assigned by each machine. Thus, the same executable with one or more may be associated with different PIDs and TIDs in the trace log.

According to one or more embodiments of the systems and methods detailed herein, specified executables with trace hooks are assigned a specific PID and TID so that, regardless of the machine on which the code is executed, the trace log will always include the same PID and TID for the specified executable.

Figure 1:
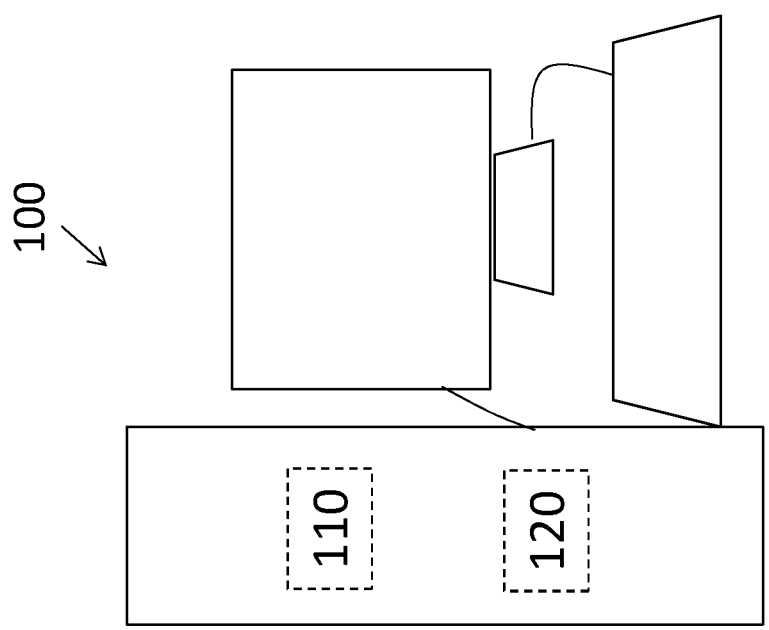
FIG. 1 is a block diagram of a system that executes software code to generate a trace log according to one or more embodiments.

With reference now to FIG. 1, a block diagram is shown of a system 100 that executes software code to generate a trace log according to one or more embodiments. The system 100 includes one or more processors 110 and one or more memory devices 120. According to alternate embodiments, the code may be executed by two or more of the processors 110 of the system 100 or one or more of the processors 110 of two or more different interconnected systems 100. The system 100 can include other known components of a processing system such as an input interface (e.g., keyboard, mouse), an output interface (e.g., display), and communication interface. The input interface can be used to designate trace hooks and also to generate a database of reserved PIDs and TIDs, as detailed below. The output interface can be used to review the trace log resulting from execution of the code.

FIG. 2 shows an exemplary database 200 of reserved PIDs 203 and TIDs 204 according to one or more embodiments. The exemplary database in Table 1 includes three entries 205a, 205b, 205c (generally, 205) and specifies the event handler 201 and executable name 202, as well as the PID 203 and one or more TIDs 204, for each entry 205. As FIG. 2 indicates, two entries 205b, 205c are associated with the executable name 202 "nfsd." Each of the entries 205b, 205c has a unique event handler 201 "1002", "1003", respectively. Each of the entries 205b, 205c represents a different instantiation of the same executable. FIG. 2 also indicates that two of the entries 205a, 205c in the exemplary database 200 are associated with more than one TID 204. In this case, when a new thread is created for the same executable, the next TID 204 in the database 200 is assigned, along with the same PID 203, for that executable, as discussed with reference to FIG. 5. Instead, when a new executable with the same name is instantiated, a different entry 205, if one exists in the database 200, is assigned, as discussed with reference to FIG. 4.

When an executable with the executable name 202 is instantiated but an event handler is not available, then the default process of assigning the PID 203 and TID 204 (e.g., randomly) is used. For example, when a third executable with the executable name 202 "nfsd" is instantiated, the two event handlers 201 "1002" and "1003" associated with that executable name 202 will have already been used, and a PID 203 and TID 204 are not available in the database 200 for the executable. Similarly, when a new thread is created for an executable in the database 200, but all of the TIDs 204 in the database 200 for that executable have been assigned, then the default process of assigning the PID 203 and TID 204 (e.g., randomly) is used. For example, when a new thread of executable name 202 "syncd" is created, but the three TIDs 204 in the database 200 have previously been assigned, then the latest thread must be assigned a TID 204 according to the default process.

Whether or not a TID 204 from the database 200 is available for assignment (i.e., has not already been assigned) may be indicated in a number of ways. The exemplary database 200 shown in FIG. 2 includes a use indicator 206 which indicates the available TIDs 204. In the example, a "0" indicates that the TID 204 is available and a "1" indicates that the TID 204 has been used. This use indicator 206 is updated each time a TID 204 is used from the table 200. Based on the indicator, the availability of an entry 205 (for a new executable) or a TID 204 (for a new thread of an existing executable) may be determined. For example, the use indicator 206 indicating "1" for even one TID 204 associated with an entry 205 would indicate that the event handler 201 associated with the entry 201 is unavailable for a new executable. The use indicator 206 indicating "1" for every TID 204 associated with an entry 205 would indicate that no TID 204 is available for an additional thread associated with the event handler 201.

Figure 3:
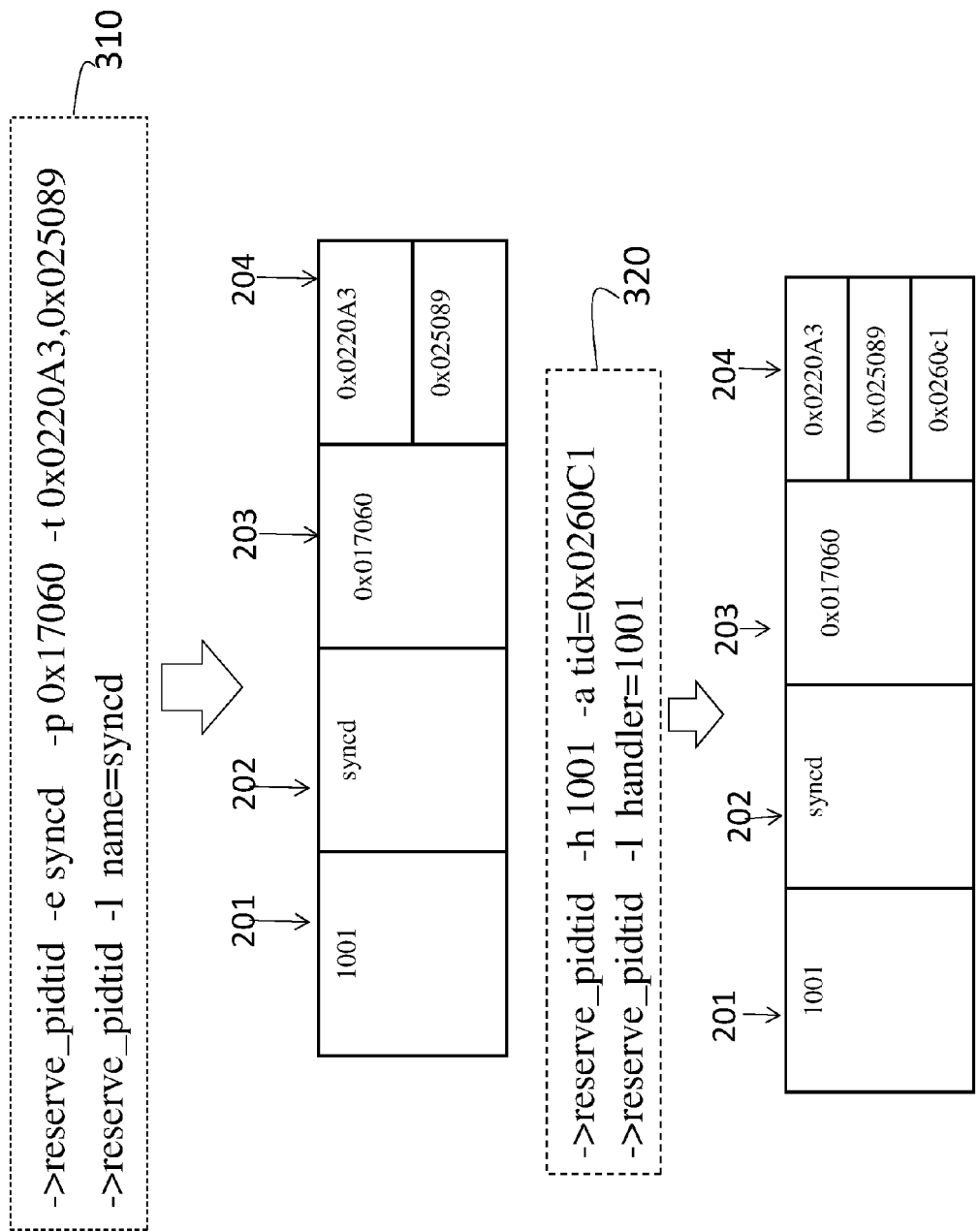
FIG. 3 shows exemplary commands to create a database according to an embodiment.

FIG. 3 shows exemplary commands used to create the database 200 according to an embodiment. The commands shown in FIG. 3 are only for explanatory purposes and are not intended to limit the different types of commands and other ways in which the database 200 can be created. The exemplary commands illustrate the flexibility of the database 200. The initial commands 310 generate an entry designating two TIDs 204, as shown. Then, prior to a different execution of the code, for example, the commands 320 may be used to add a third TID 204, as shown. Many other types of modifications of the database 200 are possible. As previously noted, executables may be added to or removed from the database 200, for example. According to an alternative or additional embodiment, an existing database 200 may be used or selected from a set of available databases 200 for a given execution of code rather than executing commands to generate the database 200. As further discussed below, according to an embodiment, commands may be executed to modify the database 200 during execution of the code rather than only between executions of the code.

Figure 4:
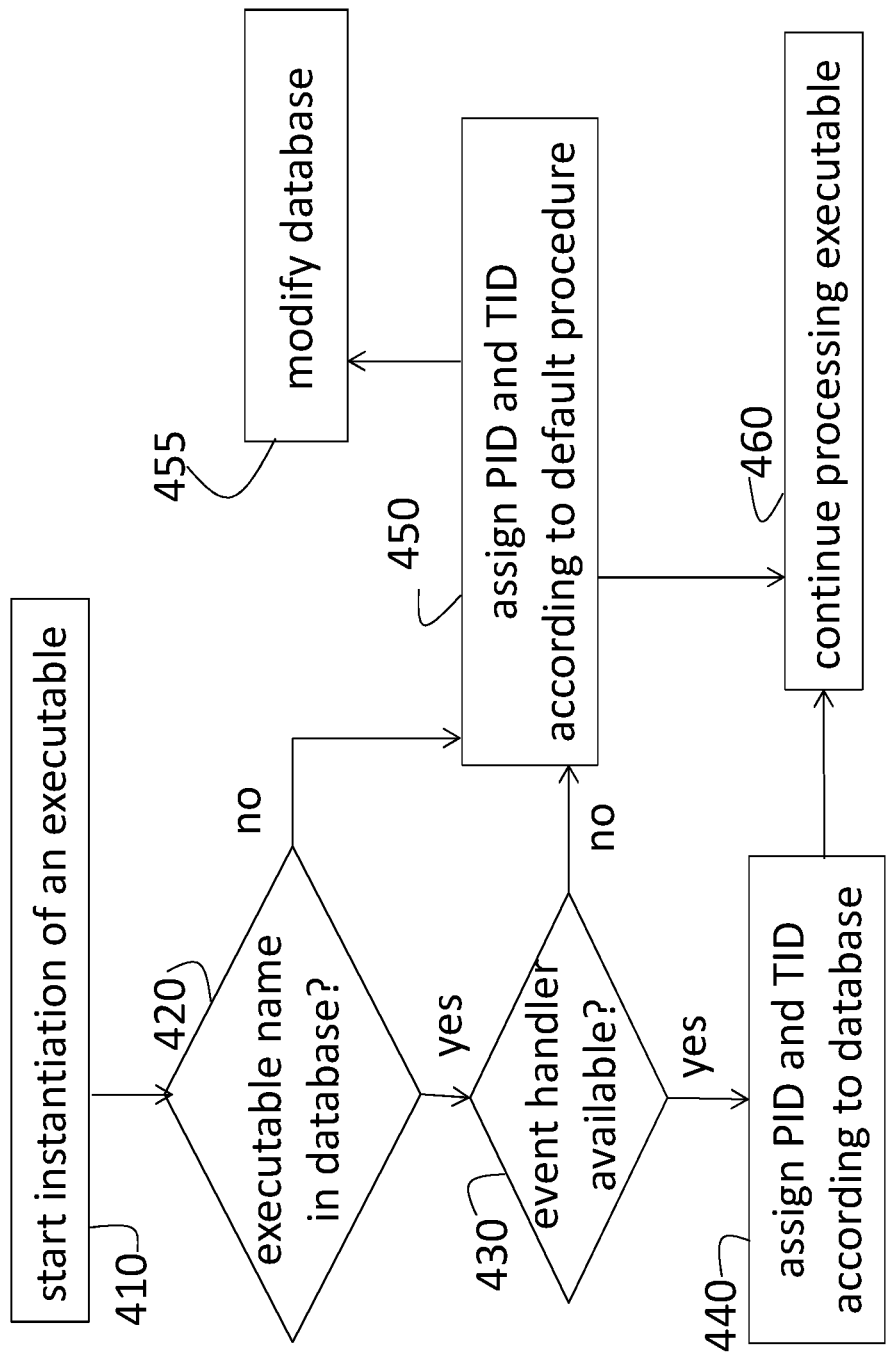
FIG. 4 is a process flow of a method of assigning process identifiers and thread identifiers to executables according to one or more embodiments.

FIG. 4 is a process flow of a method of assigning PIDs 203 and TIDs 204 to executables according to one or more embodiments. The processes shown in FIG. 4 can be performed as the executables are loaded into memory, for example. At block 410, starting an instantiation of an executable refers to the fact that the same executable can be instantiated (i.e., the same process may be performed) at multiple different times during code execution. One or more trace hooks may or may not have been designated in a given executable. Further, one or more instantiations of a given executable may or may not have an associated entry 205 in the database 200. As the example in FIG. 2 indicates, different instantiations of the same executable are associated with different entries 205b, 205c and different event handlers 201 "1002", "1003".

At block 420, a check is made of whether the current executable name 202 is in the database 200. If the executable name 202 of the current executable is in the database 200, then an additional check is done, at block 430, of whether a corresponding event handler 430 is available. As noted previously, if there are three instantiations of executable name 202 "nfsd," for example, then when the processes shown in FIG. 4 are performed for the third instantiation, there is no database 200 entry 205 (no event handler 201) available in the database 200 for the current instantiation of the executable.

If, based on the checks at blocks 420 and 430, the executable name 202 of the current executable is in the database 200 and has an available event handler 201 in the database 200, then the processes include assigning a PID 203 and TID 204 according to the database, at block 440. If the executable name 202 of the current executable is not in the database 200 (according to block 420) or there is no event handler 201 available in the database 200 for the executable (according to block 430), then the processes include assigning the PID 203 and the TID 204 according to the default procedure (e.g., randomly), at block 450.

In either the case of the executable name 202 not being included in the database 200 or the case of the event handler 201 associated with the executable name 202 not being available or both, modifying the database 200 may be performed, at block 455, according to one or more embodiments. At block 455, the PID 203 and TID 204 that are assigned according to the default procedure are added to the database 200 (i.e., a command is additionally executed to modify the database 200). The addition of the PID 203 and TID 204 affects the trace report that is generated, because additional information is added for the added executable, as detailed below. The addition of the PID 203 and TID 204 to the database 200 also modifies the database 200 for subsequent executions of the code. Thus, the dynamic modification of the database 200, according to the optional embodiment, facilitates the inclusion of every PID 203 and TID 204 of an executable of interest in the database 200 for future executions. However, the PID 203 and TID 204 are assigned (at block 440 or at block 450), the processing of executables continues at block 460.

Figure 5:
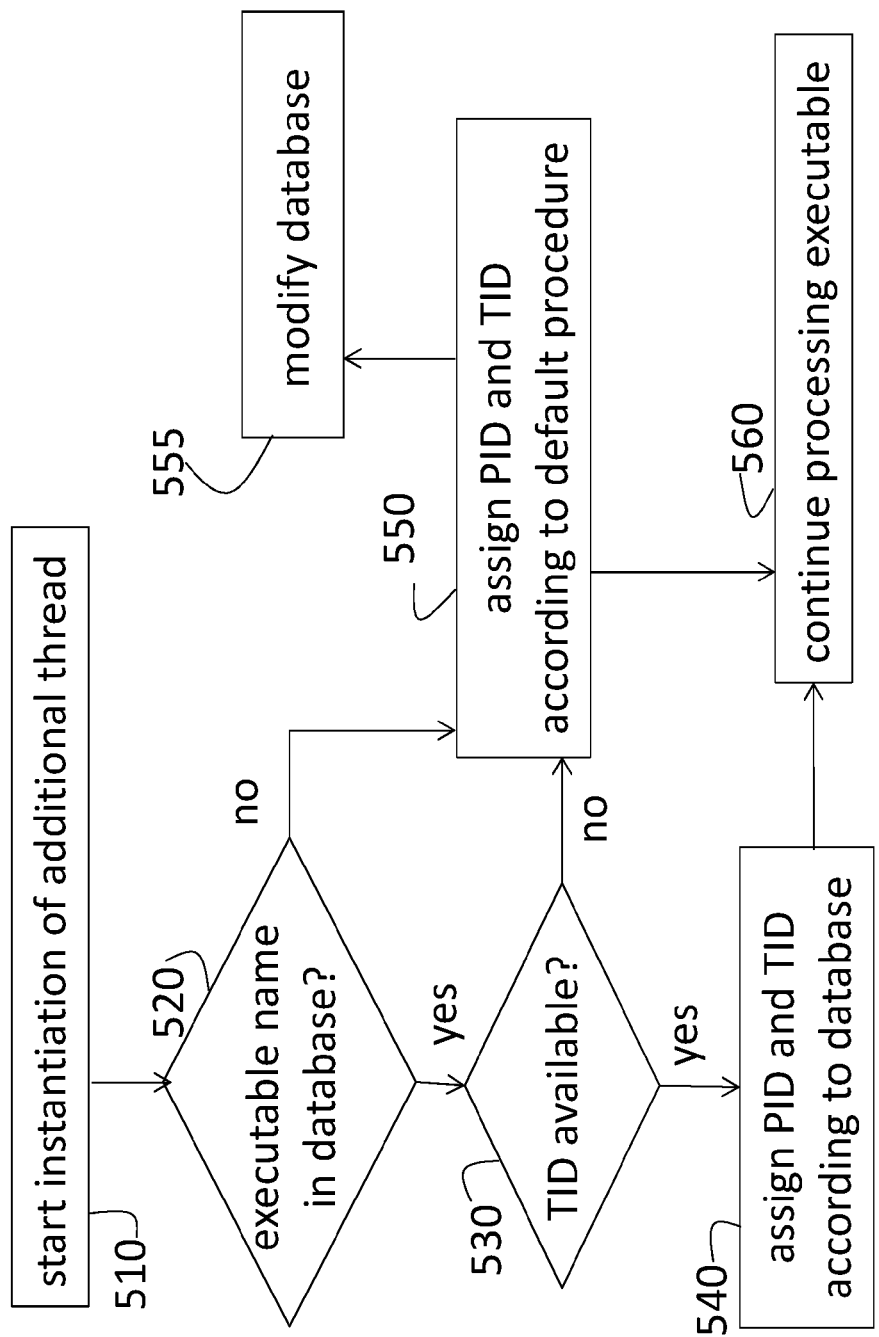
FIG. 5 is a process flow of a method of assigning process identifiers and thread identifiers to additional threads of an executable according to one or more embodiments.

FIG. 5 is a process flow of a method of assigning PIDs 203 and TIDs 204 to additional threads according to one or more embodiments. While the processes shown in FIG. 4 are performed when a new process or executable is instantiated (i.e., the first thread of the executable is instantiated), the processes shown in FIG. 5 are performed when a new thread (i.e., any thread after the first thread) is created for an existing process or executable. At block 510, starting an instantiation of an additional thread of an existing executable refers to the fact that multiple threads can be created for the same executable. One or more trace hooks may or may not have been designated for the executable and one or more instantiations of the executable may or may not have been associated with an entry 205 in the database 200.

At block 520, a check is made of whether the current executable name 202 of the thread is in the database 200. If the executable name 202 of the current executable is in the database 200, then an additional check is done, at block 530, of whether a corresponding TID 204 is available. For example, if there is a second thread created for the first instantiation (event handler 201 "1002") of the executable name 202 "nfsd," then there is no second TID 204 available in the database 200 for the current thread of the executable. The use indicator 206 may be used to make the determination of availability, according to an embodiment. To be clear, a new instantiation of an executable must be associated with a different entry 205 in the database 200 (according to the processes of FIG. 4) even if a TID 204 is available for a previously instantiated executable.

If, based on the checks at blocks 520 and 530, the executable name 202 of the current executable is in the database 200 and has an available TID 204, then the processes include assigning a PID 203 and TID 204 according to the database, at block 540. If, on the other hand, the executable name 202 of the current executable for which the additional thread is created is not in the database 200 (according to block 520) or there is no TID 204 available (according to block 530), then the processes include assigning the PID 203 and TID 204 according to the default procedure (e.g., randomly), at block 550. As noted with reference to FIG. 4, a PID 203 and TID 204 that are assigned according to the default procedure may be added to the database 200, according to an embodiment, at block 555. However, the PID 203 and TID 204 are assigned (at block 540 or at block 550), the processing of the executables continues at block 560.

During execution of the code, a log is written in memory buffers within one or more memory devices 120. The log includes information associated with each trace hook. A trace report is generated from the log. When the trace hook is part of an executable that is assigned a PID 203 and TID 204 from the database 200 according to processes in FIGS. 4 and 5, then the trace hook information is stored in the log in association with a PID 203 and TID 204 in the database 200. According to one or more embodiments, when the trace hook is associated with a PID 203 and TID 204 from the database 200, then additional information is added to the trace report, as detailed with reference to FIG. 6.

Figure 6:
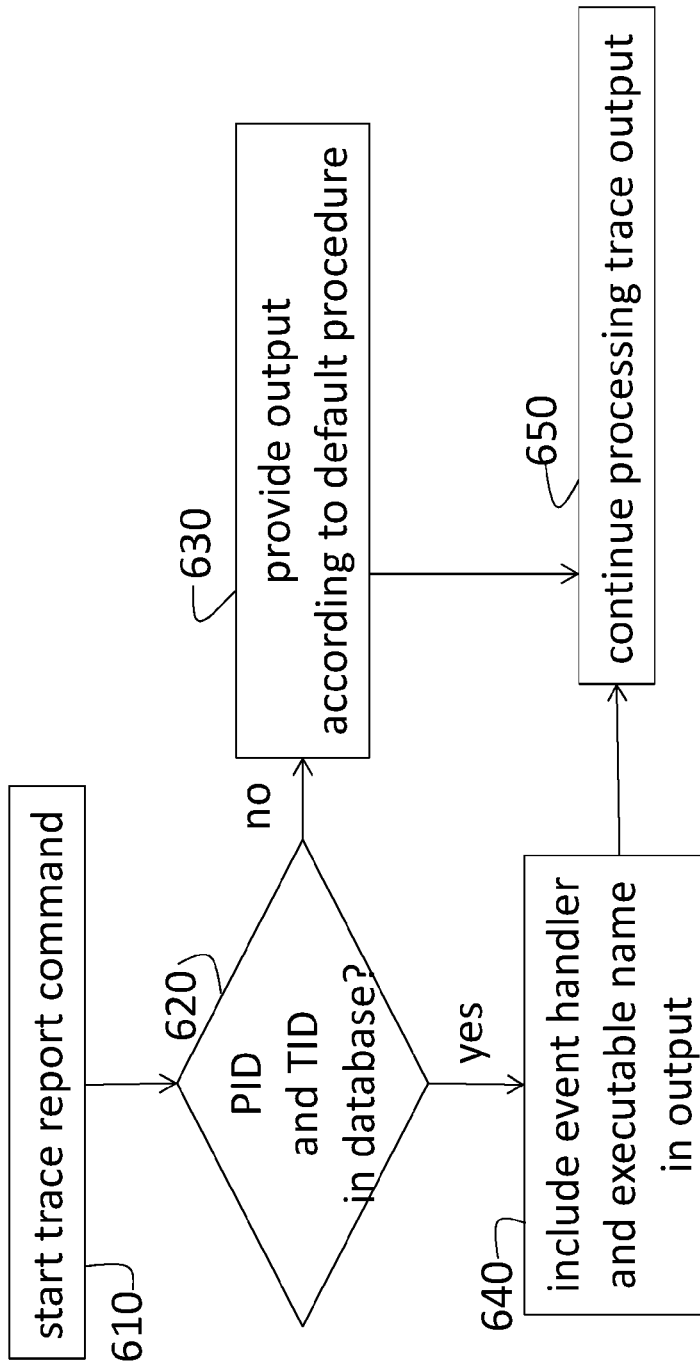
FIG. 6 is a process flow of a method of writing entries to a trace report according to one or more embodiments.

FIG. 6 is a process flow of a method of writing entries to a trace report according to one or more embodiments. The processes shown in FIG. 6 are performed following the execution of code with one or more designated trace hooks in one or more executables. At block 610, the processes include starting the trace report command. A check is performed, at block 620, of whether the PID 203 and TID 204 associated with the trace hook (i.e., the PID 203 and TID 204 of the executable that was running when the trace hook data was written in the log) are in the database 200. If the PID 203 and TID 204 associated with the trace hook are not in the database 200, then, at block 630, providing output according to the default procedure includes including information in the trace report that is typically included. If the PID 203 and TID 204 associated with the trace hook are in the database 200, then including the event handler 201 and executable name 202 in the output as part of the trace report is performed at block 640. Whether additional information was included (at block 640) or not (at block 630), the processes include continuing the processing of trace output at block 650 until every entry in the log is processed.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of debugging software code, the method comprising:
    storing a database table that specifies previous executions of one or more executables of the software code, one or more event handlers, one or more executable names, one or more reserved process identifiers (PID)'s, one or more thread identifiers (TID)'s and one or more use indicators and their associations with one another;
    starting execution, using a processor, an instantiation of an executable within the software code;
    determining whether the instantiation of the executable comprises an executable name that corresponds with an executable name entry in the database table;
    determining whether an event handler is available for said executable name based on the database tables associations for said executable name;
    assigning a reserved PID and one of the one or more TIDs associated with the executable name in the database table, to the instantiation of the executable; and debugging the software code, wherein a trace is associated with the reserved PID and the one of the one or more TIDs following the execution of the instantiation of the executable.

2. The method according to claim 1, further comprising updating the use indicator associated with one of the one of more TIDs in the database table to indicate unavailability of the one of the one or more TIDs for use by a subsequent instantiation of the executable after the assigning the reserved PID and the one of the one or more TIDs.

3. The method according to claim 2, wherein the assigning the reserved PID and the one of the one or more TIDs in the database is additionally based on an availability of the one of the one or more TIDs in the database table according to the use indicator.

4. The method according to claim 1, further comprising assigning a randomly generated PID and TID to the instantiation of the executable based on the instantiation of the executable not corresponding with any entry in the database table.

5. The method according to claim 1, further comprising logging information associated with execution of the executable in a trace log based on the process including one or more designated trace hooks.

6. The method according to claim 5, further comprising generating a trace report from the trace log with information associated with the one or more trace hooks, wherein the information includes the event handler of the executable and the executable name.

7. The method according to claim 1, further comprising creating or modifying the database table using commands, wherein each command is associated with one instantiation of one executable.

8. A system to debug software code, the system comprising:
a memory device configured to store a database table that specifies previous executions of one or more executables of the software code, one or more executable names, one or more reserved process identifies (PID)'s, one or more thread identifiers (TID)'s and one or more use indicators and there associations with one another and
a processor configured to start execution of an instantiation of an executable within the software code, determine whether the instantiation of the executable comprises an executable name that corresponds with an executable name entry in the database table, determining whether an event handler is available for said executable name based on the database tables associations for said executable name, and assign a reserved PID and one of the one or more TIDs associated with the executable name in the database table, to the instantiation of the executable, and perform debugging of the software code, wherein a trace is associated with the reserved PID and the one of the one or more TIDs following the execution of the instantiation of the executable.

9. The system according to claim 8, wherein the use indicator associated with each of the one or more TIDs, indicates the availability of each of the one or more TIDs.

10. The system according to claim 8, wherein the processor assigns a randomly generated PID and TID to the instantiation of the executable based on the instantiation of the executable not corresponding with any entry in the database.

11. The system according to claim 8, wherein the processor logs information associated with execution of the executable in a trace log based on the executable including one or more designated trace hooks.

12. The system according to claim 11, wherein the processor generates a trace report from he trace log with information associated with the one or more trace hooks, and the information includes the event handler of the executable and the executable name.

13. The system according to claim 8, further comprising an input interface configured to obtain commands used to create or modify the database, wherein each command is associated with one instantiation of one executable.

14. A computer program product for debugging software code, the computer program product comprising a computer readable storage medium having program instructions embodied therewith, the program instructions executable by a processor to perform a method comprising:
storing a database table that specifies previous executions of one or more executables of the software code, one or more event handlers, one or more executable names, one or more reserved process identifiers (PID)'s, one or more thread identifiers (TID)'s and one or more use indicators and their associations with one another;
starting execution of an instantiation of an executable within the software code;
determining whether the instantiation of the executable comprises an executable name that corresponds with an executable name entry in the database table; and
assigning a reserved PID and one of the one or more TIDs associated with the executable name in the database table, to the instantiation of the executable debugging the software code, wherein a trace is associated with the reserved PID and the one of the one or more TIDs following the execution of the instantiation of the executable.

15. The computer program product according to claim 14, further comprising updating the usage indicator associated with one of the one or more TIDs in the database table to indicate unavailability of the one of the one or more TIDs for use by a subsequent instantiation of the executable after the assigning the reserved PID and the one of the one or more TIDs.

16. The computer program product according to claim 15, wherein the assigning the reserved PID and the one of the one or more TIDs from among the reserved PIDs and the TIDs in the database table is additionally based on an availability of the one of the one or more TIDs in the database according to the use indicator.

17. The computer program product according to claim 14, further comprising assigning a randomly generated PID and TID to the instantiation of the executable based on the instantiation of the executable not corresponding with any entry in the database.

18. The computer program product according to claim 14, further comprising logging information associated with execution of the executable in a trace log based on the executable including one or more designated trace hooks.

19. The computer program product according to claim 18, further comprising generating a trace report from the trace log with information associated with the one or more trace hooks, wherein the information includes the event and the executable name.

20. The computer program product according to claim 14, further comprising creating or modifying the database table based on commands, wherein each command is associated with one instantiation of one executable.

\* \* \* \* \*